United States Patent
Krippner et al.

(10) Patent No.: US 7,393,373 B1
(45) Date of Patent: Jul. 1, 2008

(54) PORTABLE CLEAN MOLDING APPARATUS AND METHOD OF USE

(75) Inventors: Gerry R. Krippner, Vista, CA (US); Dean F. Gaffney, Carlsbad, CA (US)

(73) Assignee: H.K. Plastics Engineering, Inc., Oceanside, CA (US)

( * ) Notice: Subject to any disclaimer, the term of this patent is extended or adjusted under 35 U.S.C. 154(b) by 677 days.

(21) Appl. No.: 10/866,926

(22) Filed: Jun. 14, 2004

(51) Int. Cl.
*B03C 1/02* (2006.01)
*B03C 3/016* (2006.01)

(52) U.S. Cl. ............... 55/385.2; 454/187; 454/158; 600/21; 128/205.26; 425/73

(58) Field of Classification Search ......... 55/385.2; 454/187, 158; 600/21; 128/205.26; 425/73
See application file for complete search history.

(56) References Cited

U.S. PATENT DOCUMENTS

| | | | |
|---|---|---|---|
| 4,723,480 A | 2/1988 | Yagi et al. | 98/115.3 |
| 4,981,634 A | 1/1991 | Maus et al. | 264/102 |
| 5,139,459 A | 8/1992 | Takahashi et al. | 454/187 |
| 5,316,560 A | 5/1994 | Krone-Schmidt et al. | 55/385.2 |
| 5,360,371 A * | 11/1994 | Bartimote | 454/56 |
| 5,401,212 A | 3/1995 | Marvell et al. | 454/187 |
| 5,425,793 A | 6/1995 | Mori et al. | 55/385.2 |
| 5,464,475 A | 11/1995 | Sikes et al. | 118/719 |
| 5,687,542 A | 11/1997 | Lawecki et al. | 53/122 |
| 5,759,218 A * | 6/1998 | Martin et al. | 55/385.1 |
| 5,833,726 A | 11/1998 | Kinkead et al. | 55/356 |
| 5,843,196 A * | 12/1998 | Leavey et al. | 55/356 |
| 5,953,884 A | 9/1999 | Lawecki et al. | 53/428 |
| 5,997,399 A | 12/1999 | Szatmary | 454/187 |
| 6,010,400 A | 1/2000 | Krainiak et al. | 454/187 |
| 6,145,277 A | 11/2000 | Lawecki et al. | 53/428 |
| 6,238,283 B1 | 5/2001 | Matsuyama et al. | 454/187 |
| 6,338,675 B2 * | 1/2002 | Winkelman | 454/56 |
| 6,499,931 B1 * | 12/2002 | Garrett et al. | 414/406 |
| 6,623,538 B2 | 9/2003 | Thakur et al. | 55/385.2 |
| 6,770,108 B2 * | 8/2004 | Cherry, Sr. | 55/385.2 |
| 7,156,897 B2 * | 1/2007 | Wen | 95/28 |

\* cited by examiner

*Primary Examiner*—Duane Smith
*Assistant Examiner*—Minh-Chau T. Pham
(74) *Attorney, Agent, or Firm*—Mind Law Firm; Jeromye V. Sartain

(57) ABSTRACT

A portable clean molding apparatus for receipt of molded articles ejected from a mold machine. The apparatus includes a receiving chamber having a first interior space and a selectively openable first door, a secondary chamber joined to the receiving chamber and having a second interior space and a selectively openable second door, and an air filtration cover unit installed over the receiving and secondary chambers so as to provide a low-particulate, positive airflow into the first and second interior spaces. The apparatus further includes at least one vent communicating with the second interior space so as to allow the airflow to exit the secondary chamber and at least one chute communicating with the first interior space so as to allow the airflow to exit the receiving chamber, the chute being located adjacent to the mold machine for the transfer of molded articles to the receiving chamber.

16 Claims, 8 Drawing Sheets

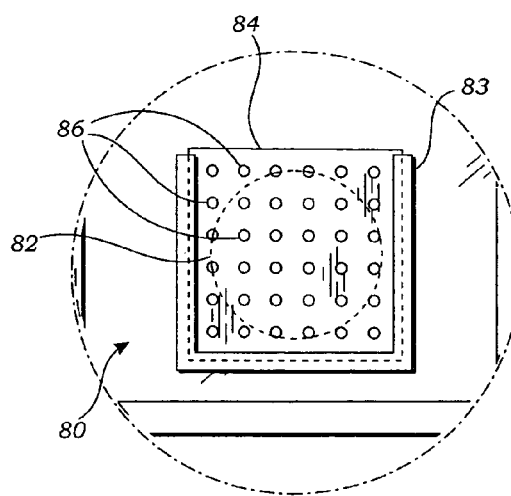
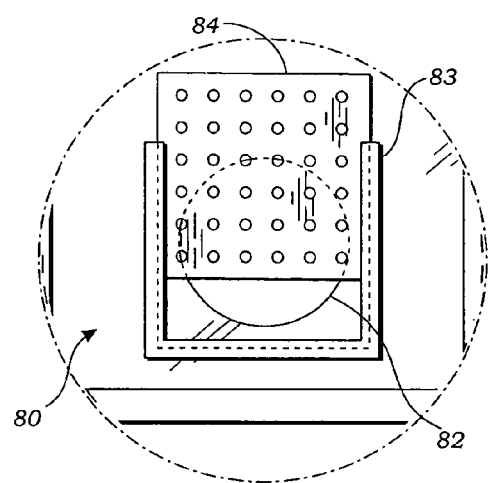
*Fig. 9a*  *Fig. 9b*
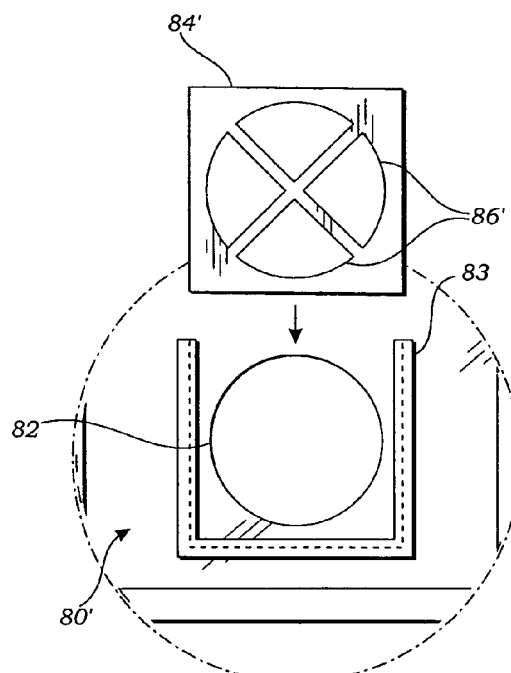
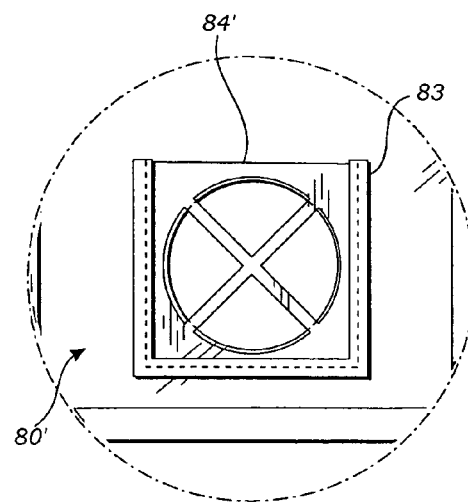
*Fig. 9c*  *Fig. 9d*

PORTABLE CLEAN MOLDING APPARATUS AND METHOD OF USE

INCORPORATION BY REFERENCE

Applicants hereby incorporate herein by reference any and all U.S. patents and U.S. patent applications cited or referred to in this application.

BACKGROUND OF THE INVENTION

1. Field of the Invention

An aspect of this invention relates generally to clean environments, and more particularly to portable clean environments employed in the field of molding.

2. Description of Related Art

In the molding field, it is often desirable to mold parts in a low particulate count environment. This is particularly true for medical and optical molded parts, for example. Typically, such low particulate count molding is accomplished by locating the entire mold machine within a clean environment, such as a class 100,000 clean room. However, it is generally costly to maintain such a clean room, much less a lower particulate count permanent environment on the order of class 100, and the molder is often also then limited to the particular mold machine that is installed within the clean room, creating potential problems in production scheduling and in the event of machine downtime.

To address some of these concerns common to locating a mold machine in a permanent clean room, temporary clean rooms and other portable clean environments have been developed in the art. These temporary and portable clean environments are also relatively expensive to operate and/or are generally not capable of maintaining a low particulate count environment on the order of class 100 independent of a larger clean room within which they are designed to operate.

The following art defines the present state of this field:

U.S. Pat. No. 4,723,480 to Yagi et al. is directed to a manufacturing apparatus equipped with product transfer means arranged along the flow of products and provided with an air cleaning device. A partition panel is provided on the downstream side of the clean air blow-off vent of the air cleaning device so as to form a clean air passageway and prevent dust from penetrating into the passageway, so that goods are manufactured and transferred in the cleaned air passageway.

U.S. Pat. No. 4,981,634 to Maus et al. is directed to an injection molding process that creates a micro-cleanroom environment inside a mold cavity which can stay closed to airborne contaminants while ejecting and transferring the molded part out. The molded part is formed and solidified at a parting-line plane within the mold cavity, then is carried rearward on the movable mold insert to a second plane where it is stripped off and transferred out through a discharge aperture which is open when the mold cavity is in the second plane but closed off when in the first plane. The aperture faces substantially downward to prevent entry by upwelling thermal air currents. External supplied filtered gas can provide positive pressure through vents within the moldset's internal space. This maximizes mold and part cleanliness while speeding up "mold-open" cycle and may eliminate HEPA filters/enclosures and robots. Optical disks, lenses, food packaging and medical parts are suggested uses.

U.S. Pat. No. 5,139,459 to Takahashi et al. is directed to a clean transfer method capable of safely transferring a semiconductor or the like to various apparatuses for treating the semiconductor while keeping the environment clean. In the method, the semiconductor is transferred between a vacuum clean box arranged in a clean room and kept at the degree of vacuum of 1 Torr or less and a vacuum chamber arranged in a maintenance room while transfer ports of the vacuum clean box and vacuum chamber are kept air-tightly connected to each other. The vacuum clean box is movably arranged.

U.S. Pat. No. 5,316,560 to Krone-Schmidt et al. is directed to an apparatus for controlling the environment of an enclosed space. The apparatus includes a workspace compartment within a gas-tight chamber, a mechanism for circulating dehumidified gas in true laminar flow through the workspace compartment, and a highly efficient filtering component for removing contaminants from the gas.

U.S. Pat. No. 5,401,212 to Marvell et al. is directed to an environmental control system including a modular isolation chamber. Together with associated atmospheric regulatory equipment, the connectable modular chambers provide a smaller, cost-effective alternative to the traditional clean rooms utilized for fabricating or processing semiconductors and other products. Because the work pieces and processing or other machinery are isolated from the remainder of the rooms in which they are located, decontamination of much of each room is not required. Use of the portable, modular chambers of the present invention also permits increased control over particulate contaminates smaller than heretofore satisfactorily regulated and individualized regulation of differing processing environments within a single room.

U.S. Pat. No. 5,425,793 to Mori et al. is directed to chamber units are sequentially coupled with each other to thereby provide a volume of clean space, and whereby different environments can be maintained in the different chamber units. An air blowhole or door is provided at an opening section of each chamber unit. Moreover, a space section can be defined at the coupling part of the chamber units, and a suction pump and a suction hose can be provided in the space section, so as to prevent the environments of the different chambers from influencing one another.

U.S. Pat. No. 5,464,475 to Sikes et al. is directed to an improved machine for performing a manufacturing process on a workpiece. The machine includes a cabinet defining an interior workspace for performing the manufacturing process. The workpiece is placed in the workspace by an operator. The cabinet is coupled with a gas source for receiving a flow of gas from the gas source. The improvement comprises a first aperture in the cabinet providing access to an interior chamber within the cabinet. The interior chamber has an interior surface and an open end aligned with the first aperture for storing a work-in-process unit. The interior chamber is accessible to the operator for transferring the work-in-process unit between the interior chamber and the workspace. The improvement further comprises a second aperture in the interior surface of the interior chamber, the second aperture admitting the flow of gas from the gas source to establish a laminar flow of the gas in the chamber intermediate the first aperture and the second aperture.

U.S. Pat. Nos. 5,687,542, 5,953,884 and 6,145,277 to Lawecki et al. are directed to an apparatus and method for manufacturing articles, such as syringe barrels, substantially free from contaminants. The apparatus is an enclosure defining at least a class 100 and MCB-3 environment, and includes a molding isolation module and a packaging isolation module. Any contaminants that may exist within the enclosure are removed by the use of horizontal and vertical laminar airflows directed into air filter units. Further, the molding temperature may be selected such that it renders the fabricated articles substantially free from contaminants. The molding isolation module and packaging isolation module keep the fabricated articles substantially free from contaminants from the time the articles are molded to the time the articles are placed in sealed containers for shipment.

U.S. Pat. No. 5,833,726 to Kinkead et al. is directed to a scheme for defining, inside a processing facility, a storage environment that is substantially free of a targeted molecular contaminant and in which one or more substrates are to be stored for a period of time before or after a substrate processing step; the scheme including: an air blower for providing a flow of air within a storage environment defined inside a processing facility; a substrate support for holding one or more substrates inside the storage environment; and a molecular air filter having an input face positioned to receive air from the blower and having an output face for providing a flow of filtered air inside the storage environment, the molecular air filter being constructed and arranged to remove an airborne molecular contaminant from air flowing into the storage environment to achieve a concentration level of the molecular contaminant inside the storage environment suitable for storing one or more substrates therein for a sit time corresponding to the time before a subsequent substrate processing step; wherein the storage environment is substantially free of the targeted airborne molecular contaminant. Schemes for defining substrate storage environments for semiconductor device fabrication processes are also disclosed.

U.S. Pat. No. 5,997,399 to Szatmary is directed to an apparatus for providing a clean working environment including an isolation booth, a worker booth, and an access device arranged to enable a worker in the worker booth to handle material in an isolation chamber formed in the isolation booth. A pressure generator is positioned to communicate with the isolation chamber to generate an air pressure therein that is less than the air pressure of an air curtain passing through the worker booth so that air is drawn from the air curtain in the worker booth into the isolation chamber through any air leak opening that develops in and around the access device so as to block outflow of air in the isolation chamber to the worker booth through the air leak opening.

U.S. Pat. No. 6,010,400 to Krainiak et al. is directed to an isolation work station comprising an enclosure and an air circulation system and high efficiency air filter for generating a downwardly directed laminar air flow through the enclosure. Periodic sterilization of the enclosure may be accomplished by adding a sterilant, such as vaporized hydrogen peroxide, to the airstream, and the filter is impregnated with a catalyst for degrading the vaporized hydrogen peroxide during the purge cycle and wherein the airstream is circulated at a relatively low speed so as to increase the residence time in the filter.

U.S. Pat. No. 6,238,283 to Matsuyama et al. is directed to a work conveying and transferring apparatus having a trolley having a casing defining a hermetically sealed space, and a support portion provided on the trolley for placing at least one container containing a cassette carrying works. A container opening device is provided on the trolley to open the container placed on the support portion, and a cassette transferring device is provided for transferring the cassette from the trolley to a treating apparatus, with the container placed on the support portion opened. The support portion is provided in the sealed space, and works can be double sealed by the sealed space and the container.

U.S. Pat. No. 6,623,538 to Thakur et al. is directed to a compact, portable, lightweight, low power consuming, convenient, versatile and sterile laminar airflow device, useful in obtaining a workspace substantially devoid of airborne particulate contaminants, said device having a body divided into upper and lower chambers; the upper chamber housing one or more pre-filtration members, a motor driving a fan, and one or more filters located below the motor; and the lower chamber provided with a slidable front panel, a removable platform located at the lower portion of the chamber and a perforated plane placed on the removable platform.

The prior art described above teaches a manufacturing apparatus with an air cleaning device, an injection molding process operating without opening the mold to airborne contaminants, a clean transfer method and system therefor, an environment control apparatus, an environmental control system, a coupling-type clean space apparatus, a work-in-process storage pod, an isolation module for molding and packaging articles substantially free from contaminants, storing substrates between process steps within a processing facility, an isolation chamber air curtain apparatus, an isolation workstation, a double-sealed work conveying and transferring apparatus and container inspecting method, and a sterile laminar airflow device, but does not teach a portable clean molding apparatus and method providing for the receipt of parts molded in a mold machine, manipulating such parts in a low particulate count environment, and passing the manipulated parts out of the portable clean molding apparatus without compromising its low particulate count environment, and wherein the portable clean molding apparatus and the mold machine are both not located in a clean room. Aspects of the present invention fulfill these needs and provide further related advantages as described in the following summary.

SUMMARY OF THE INVENTION

Aspects of the present invention teach certain benefits in construction and use which give rise to the exemplary advantages described below.

The present invention is generally directed to a portable clean molding apparatus for receipt of molded articles ejected from a mold machine, comprising a receiving chamber having a first interior space and a first side including a selectively openable first door, a secondary chamber joined to the receiving chamber substantially along the first side and having a second interior space and a second side including a selectively openable second door, and an air filtration cover unit installed over the receiving and secondary chambers so as to provide a low-particulate, positive airflow into the first and second interior spaces. The apparatus further comprises at least one vent intersecting the secondary chamber so as to communicate with the second interior space and allow the airflow to exit the secondary chamber and at least one chute intersecting the receiving chamber at a first end so as to communicate with the first interior space and allow the airflow to exit the receiving chamber, the chute being located adjacent to the mold machine at a second end, whereby the molded articles ejected from the mold machine pass through the chute into the receiving chamber, are there sealably packaged, are then passed into the secondary chamber through the selectively openable first door, and, after the first door has been closed, are next passed out of the secondary chamber through the selectively openable second door.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIGS. 9a-d are enlarged partial views thereof taken alternatively from circle 'a-d' of FIG. 3.

DETAILED DESCRIPTION OF THE INVENTION

Figure 1:
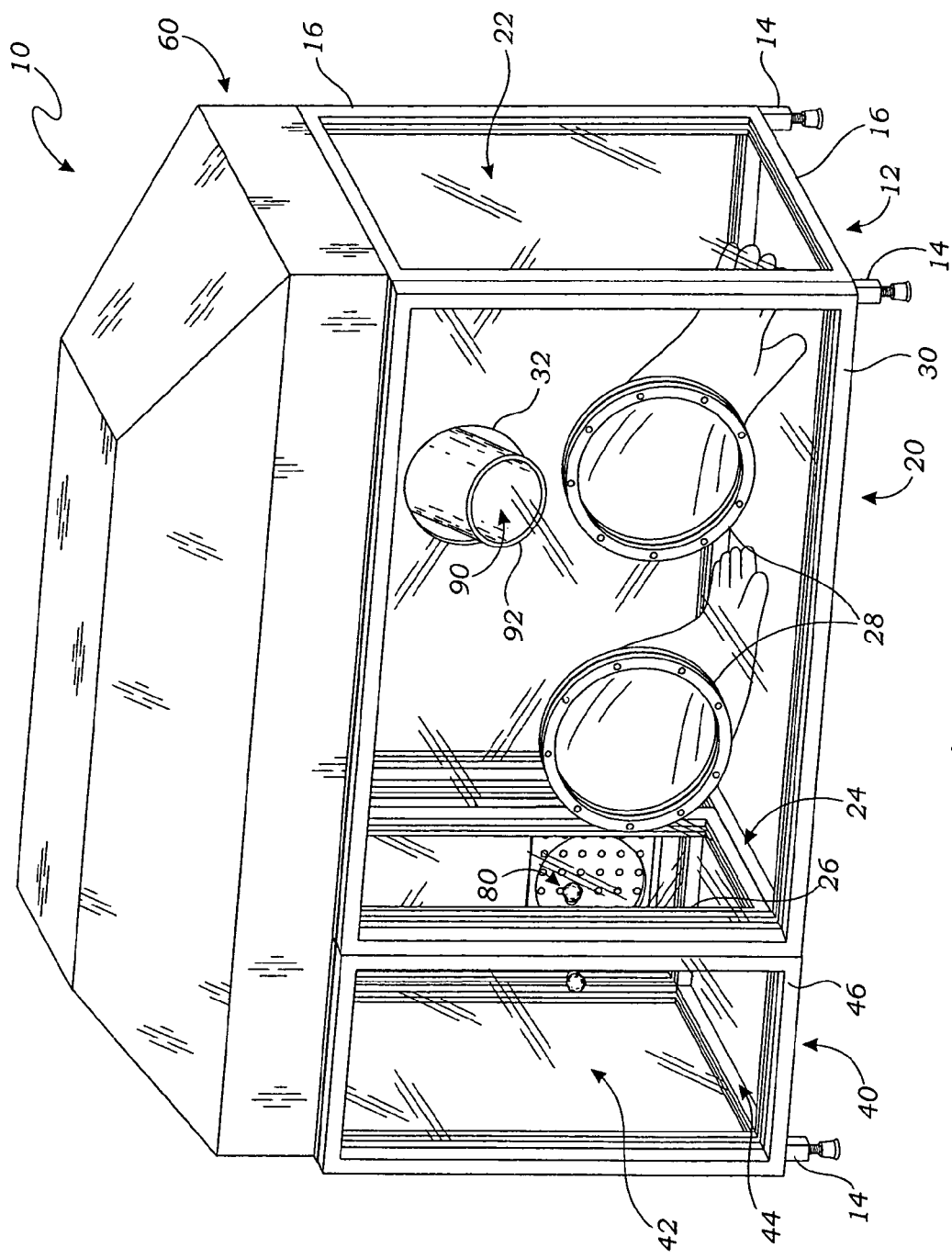
FIG. 1 is a perspective view of an exemplary embodiment of the invention.
Figure 2:
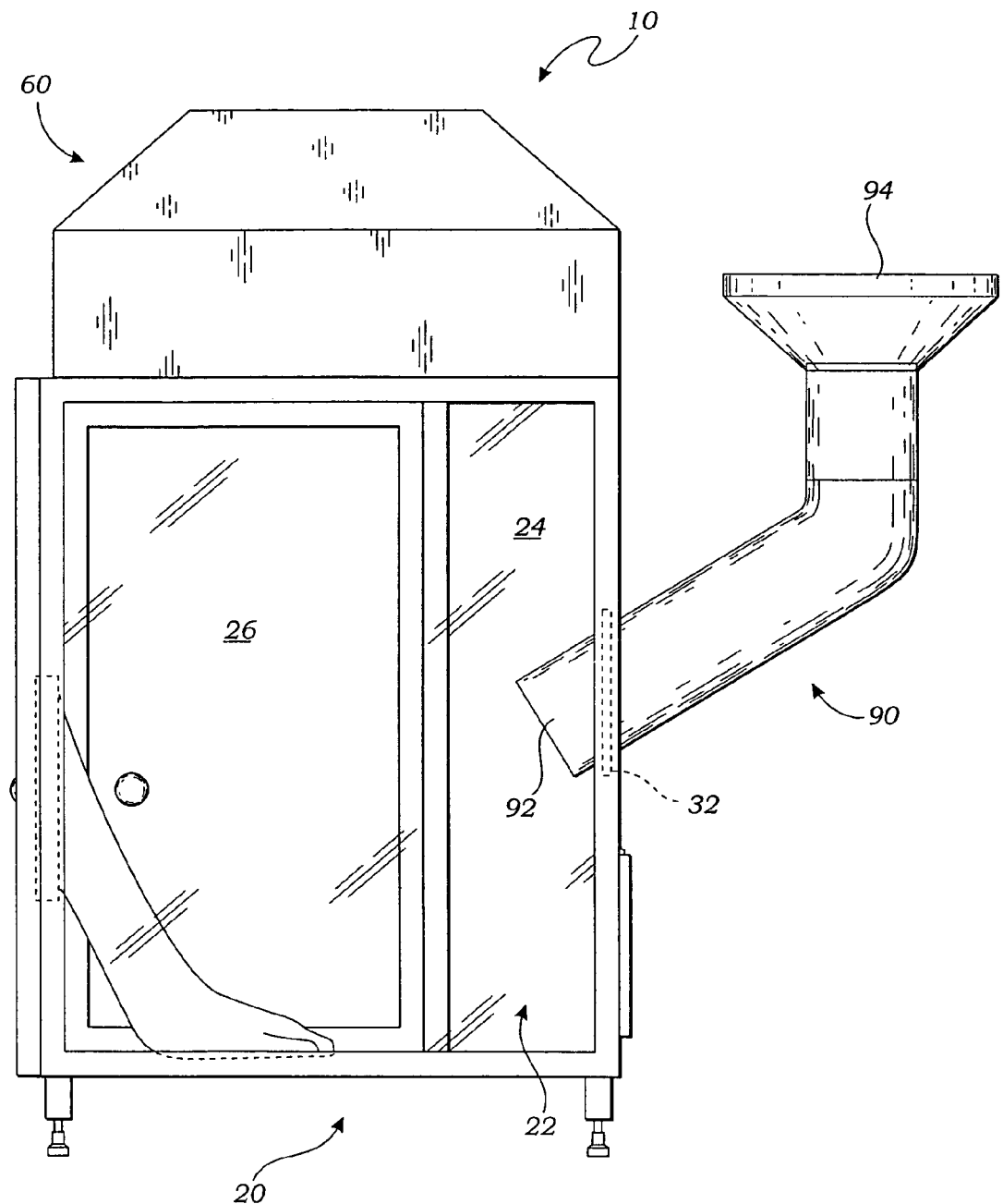
FIG. 2 is an enlarged side view thereof.
Figure 3:
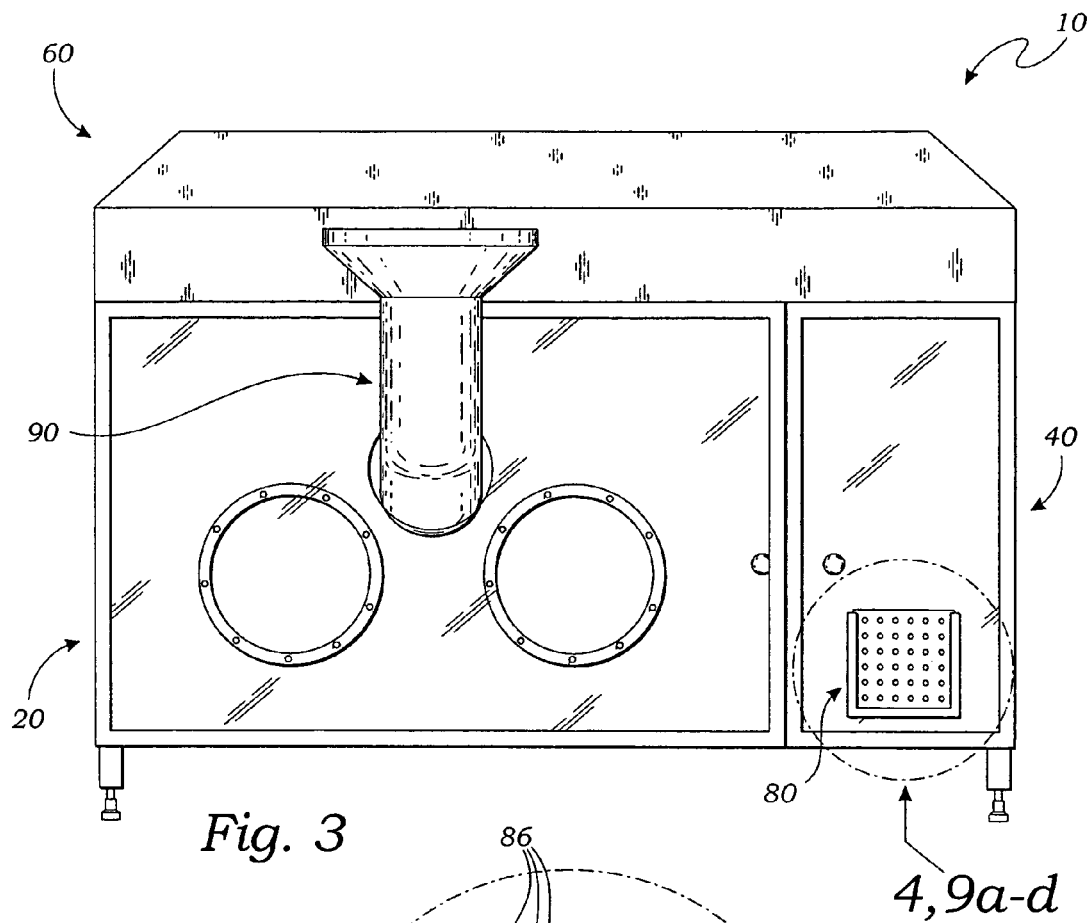
FIG. 3 is a back view thereof.
Figure 4:
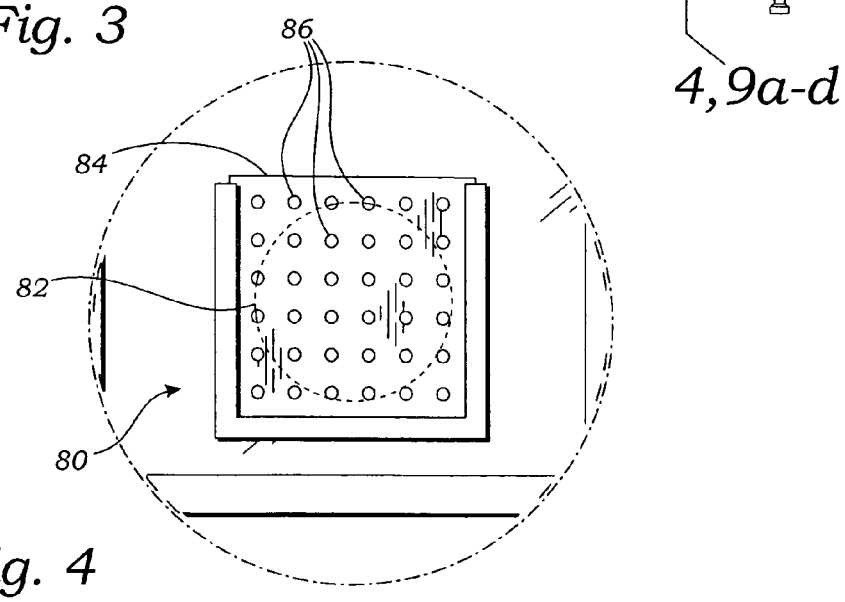
FIG. 4 is an enlarged partial view thereof taken from circle '4' of FIG. 3.
Figure 5:
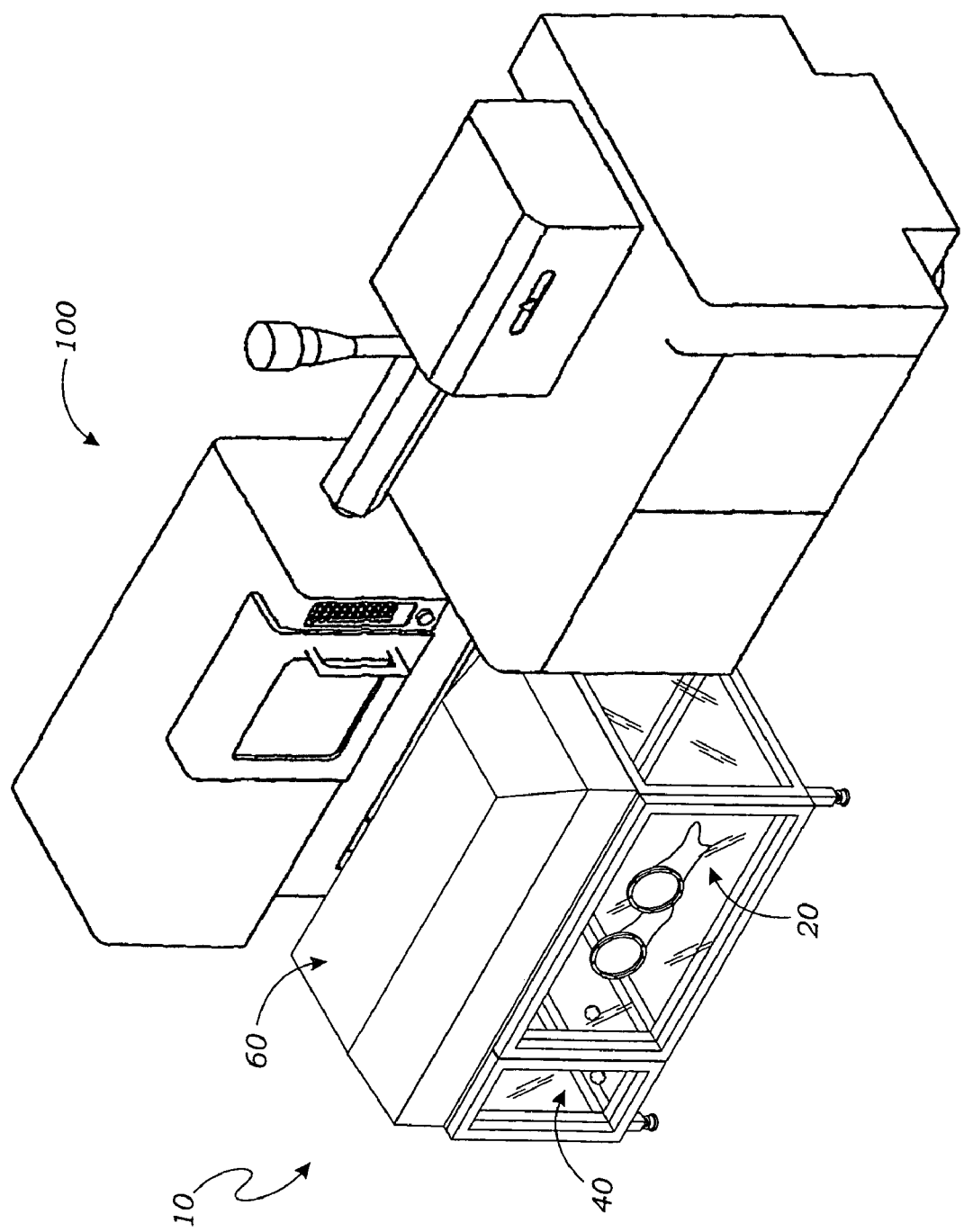
FIG. 5 is a reduced scale perspective view thereof adjacent to a mold machine.

The above described drawing figures illustrate aspects of the invention in at least one of its exemplary embodiments, which are further defined in detail in the following description.

The present invention is directed to a portable clean molding apparatus 10 for receipt of molded articles 110 ejected from a mold machine 100. The apparatus 10, which is located generally adjacent to the mold machine 100, comprises a receiving chamber 20 having a first interior space 22 and a first side 24 including a selectively openable first door 26; a secondary chamber 40 joined to the receiving chamber 20 substantially along the first side 24 and having a second interior space 42 and a second side 44 including a selectively openable second door 46; an air filtration cover unit 60 installed over the receiving and secondary chambers 20, 40 so as to provide a low-particulate, positive airflow 70 into the first and second interior spaces 22, 42; at least one vent 80 intersecting the secondary chamber 40 so as to communicate with the second interior space 42 and allow the airflow 70 to exit the secondary chamber 40; and at least one chute 90 intersecting the receiving chamber 20 at a first end 92 so as to communicate with the first interior space 22 and allow the airflow 70 to exit the receiving chamber 20 and attached to the mold machine 100 at a second end 94, whereby the molded articles 110 ejected from the mold machine 100 pass through the chute 90 into the receiving chamber 20, are there sealably packaged, are then passed into the secondary chamber 40 through the selectively openable first door 26, and, after the first door 26 has been closed, are next passed out of the secondary chamber 40 through the selectively openable second door 46, as explained in more detail below. It will be appreciated by those skilled in the art that by packaging the molded articles 110 in the low-particulate count environment of the receiving chamber 20, then passing the packaged molded articles 110 into the second low-particulate count environment of the secondary chamber 40, and again closing the receiving chamber 20 before accessing the articles 110 in the secondary chamber 40, the receiving chamber 20, and thus the molded articles 110 themselves, remain essentially uncompromised while allowing the articles 110 to be packaged and ultimately passed out of the clean molding apparatus 10 for shipment. Moreover, the stand-alone operation and portability of the clean molding apparatus 10 of the present invention allows for tremendous economy and versatility in molding a variety of articles 110 in a number of mold machines 100, none of which must be located in a dedicated clean room or other such clean environment.

In FIG. 1 there is shown an exemplary embodiment of the portable clean molding apparatus 10 of the present invention. The receiving chamber 20 and secondary chamber 40 are integrally formed on a single substantially rectangular base 12 having four legs 14 substantially at the four corners of the base 12. The legs 14 may include rigid or adjustable-height feet, wheels, coasters, or any other suitable support contacts now known or later developed in the art. The construction of the base and side frame members 16 is preferably of square-cross-section aluminum tubing, while the side panels 18 themselves are preferably of ¼" clear Lexan for visibility into the receiving and secondary chambers 20, 40. In the exemplary embodiment, the first interior space 22 is approximately double the second interior space 42, the receiving chamber 20 measuring roughly 32"×24"×23" and the secondary chamber measuring roughly 16"×24"×23". It will be appreciated by those skilled in the art that a number of other materials and configurations for forming the receiving and secondary chambers 20, 40 of the clean molding apparatus 10 are possible and that the present embodiment is merely exemplary. Specifically, while the portable clean molding apparatus 10 is shown and described as being an integral unit having the receiving and secondary chambers 20, 40 formed on a single base 12, it is entirely possible that the chambers 20, 40 could be separable units removably joined along the receiving chamber's first side 24 so as to allow communication between them through the selectively openable first door 26, as explained below. The receiving chamber 20 may be formed with one or more hand access ports 28 for accessing the first interior space 22 when the clean molding apparatus 10 is in operation, as when molded articles 110 ejected from the mold machine 100 are to be packaged and then passed through the first door 26 and into the secondary chamber 40, as also described in detail below. The receiving chamber 20 may be further formed with a front access door 28 for accessing the first interior space 22 when the clean molding apparatus 10 is not in operation so as to perform cleaning, maintenance, setup and other such functions. Though an access door 30 having two gloved hand access ports 28 is shown in the exemplary embodiment as the front side of the receiving chamber 20, those skilled in the art will appreciate that a variety of other means, both now known and later developed, can be employed in the present invention for accessing the receiving chamber's first interior space 22, both when the clean molding apparatus is operating and when it isn't. With the receiving and secondary chambers 20, 40 adjacently located as shown, the air filtration cover unit 60 is installed over both chambers so as to selectively blow a low-particulate, positive airflow 70 into the first and second interior spaces 22, 42. In the exemplary embodiment of the clean molding apparatus 10, the cover unit 60 is a 2'×4' Kydex housing, room-side control HEPA ("high efficiency particle arresting") filter unit as manufactured by Airguard of Louisville, Ky. The HEPA filter operates at 99.99% minimum efficiency at 0.3 microns particulate size and flow rates of 70 to 120 ft/min±20% measured six inches from the filter face. Based on the numerous other possible configurations and parameters of the portable clean molding apparatus 10, it will be appreciated that filtration units of various other sizes and performance levels may be employed without departing from the spirit and scope of the present invention. Moreover, air filtration devices other than the HEPA filter, both now known and later developed, may be utilized in the clean molding apparatus 10.

Turning to FIGS. 2-5, in the exemplary embodiment of the portable clean molding apparatus 10 of the present invention, the chute 90 intersects the receiving chamber 20 at a first end 92 so as to communicate with the first interior space 22 and is located adjacent to the mold machine 100 at a second end 94 such that during use the molded articles 110 ejected from the adjacent mold machine 100 pass through the chute 90 and into the receiving chamber 20. The chute 90 may be stabilized at its first end 92 within an opening 32 formed in the receiving chamber 20 using a gasket or the like (not shown), though it is to be understood that an airtight fit or seal is not required. Likewise, the chute 90 can be positioned with its second end 94 proximal to and slightly spaced apart from the mold (not shown) of the mold machine 100 or attached to the mold through a tie bar sleeve (not shown) as is known and used in the art. An exemplary such tie bar sleeve is a black neoprene, high-temperature sleeve with an approximately 2½" diameter and 20" mold open capacity manufactured and sold under part number TBS2.520 by Molding Automation Concepts of Woodstock, Ill. The positioning of the chute 90's second end 94 adjacent to the mold as being attached or only proximal to the mold may be dictated by considerations including the size and configuration of the mold and the orientation of its parting line. In the exemplary embodiment, the chute 90 is substantially tubular and itself has a diameter of approximately six inches, yielding a projected area 98 into the receiving chamber of roughly 28.3 in$^2$. As explained in more detail below, the chute 90 serves to also allow the airflow 70 to exit the receiving chamber 20 and, thus, the chute projected area 98 is one variable affecting the overall flow of air through and performance of the clean molding apparatus 10. Those skilled in the art will appreciate that the chute 90 can take on a variety of sizes and configurations as needed based on the configuration of the mold machine 100, including the mold itself (not shown) and its required opening (or the orientation of its parting line), and the size and shape of the molded articles 110. As such, the chute 90 shown and described is merely exemplary. Relatedly, the secondary chamber 40 is equipped with a vent 80 to allow the airflow 70 to exit the secondary chamber 40. Therefore, the vent projected area 88 is another variable affecting the airflow and performance of the clean molding apparatus 10. In the exemplary embodiment, the vent 80 is configured as a substantially circular opening 82 having a perforated cover 84 over the opening 82. The cover may have a number of roughly ⅜" diameter holes 86 overlapping the opening 82 so as to allow air to flow therethrough. In one embodiment, there are a total of thirty-two such holes 86 for a total vent projected area 88 into the secondary chamber 40 of approximately 3.5 in$^2$. It will be appreciated that a number of other vent configurations are possible in the present invention and that the vent 80 shown and described is only exemplary. Also in the exemplary embodiment, the selectively openable second door 46 of the secondary chamber 40 has dimensions of roughly 16"×23", resulting in a second door projected area 48 into the secondary chamber 40 of approximately 368 in$^2$. The relationship of these various projected areas to the projected areas into the respective receiving and secondary chambers 20, 40 of the cover unit 60's filter and the effect of these relationships on airflow and performance of the portable clean molding apparatus 10 of the present invention are discussed below. With continued reference to FIGS. 2-5, there is shown the selectively openable first door 26 located on the first side 24 of the receiving chamber 20 and allowing for transfer of molded articles 110 into the secondary chamber 40, as also described below. While both the first and second doors 26, 46 are shown as hinged doors pivoting about a vertical axis so as to selectively expose the opening in which each is situated, it will be appreciated by those skilled in the art that a number of other doors, curtains and other such barriers may be employed without departing from the spirit and scope of the present invention. In addition to the cover unit 60 room-side fan speed access control (not shown), the portable clean molding apparatus 10 may be further equipped with power and lighting controls and units (not shown) for the convenient and effective operation of the apparatus 10. Within the clean molding apparatus 10 there may also be provided pressure gauges or manometers and flow meters (not shown) to monitor the pressure and air flow in both chambers 20, 40 when the apparatus 10 is in operation.

Figure 6:
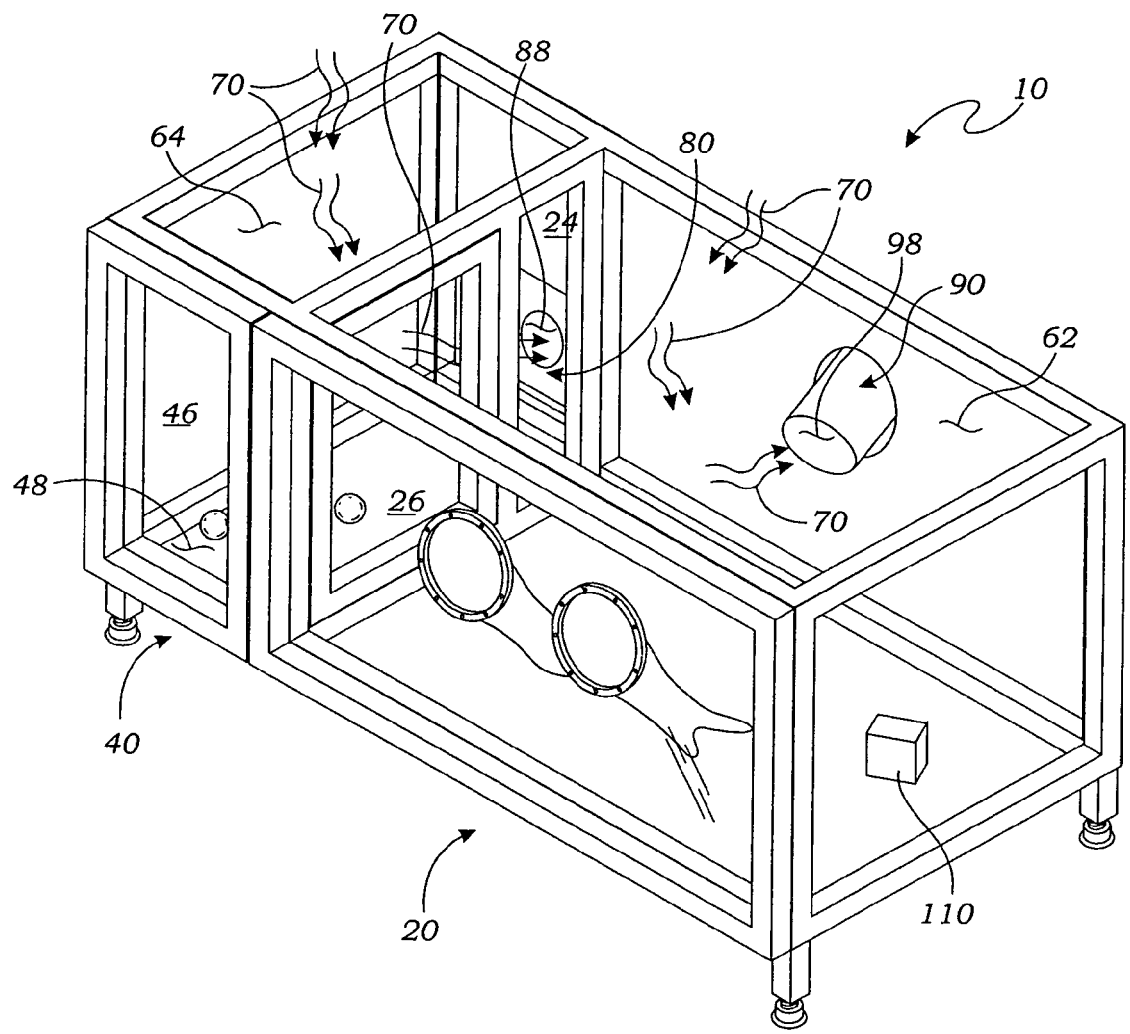
FIG. 6 is a schematic thereof in a first operational stage.
Figure 7:
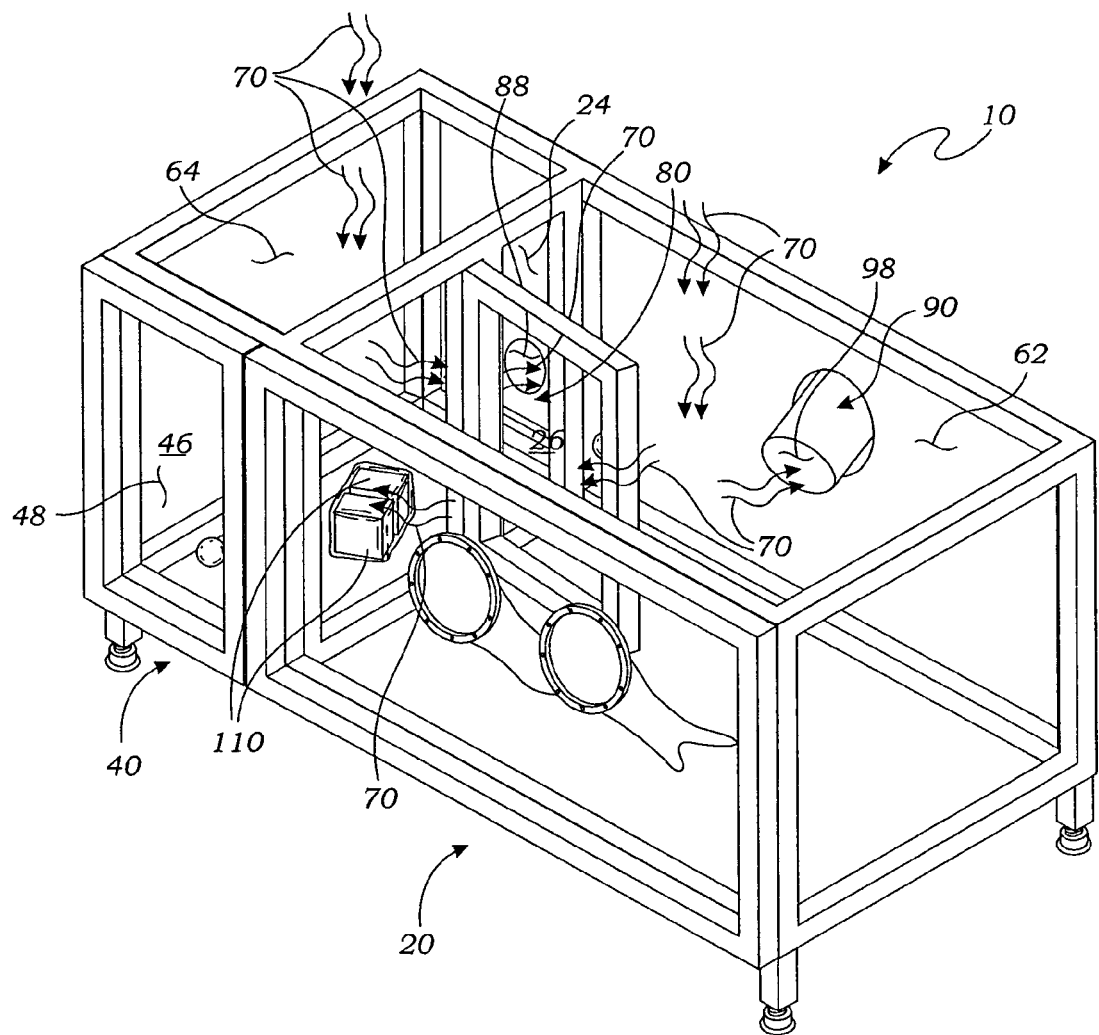
FIG. 7 is a schematic thereof in a second operational stage.
Figure 8:
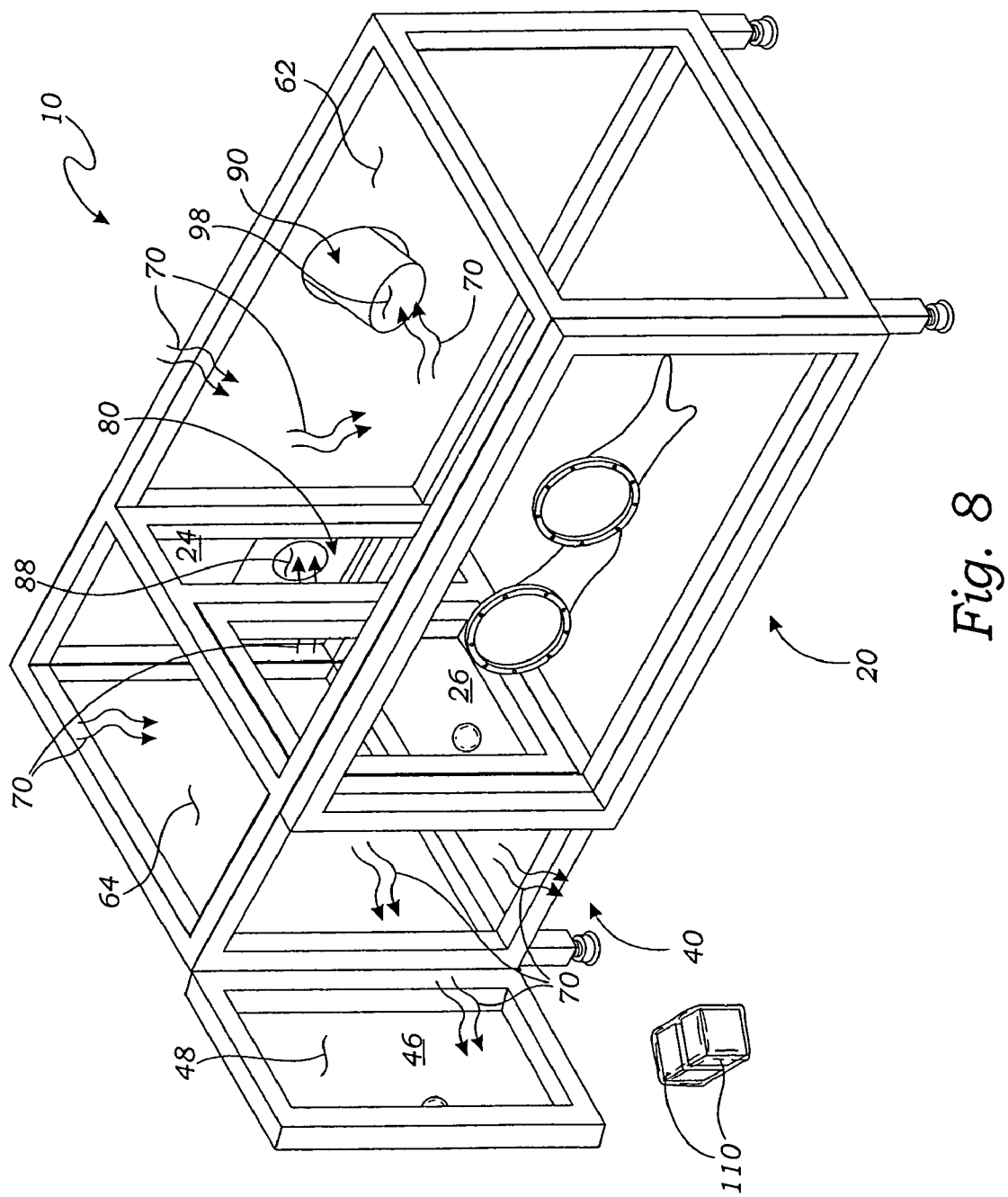
FIG. 8 is a schematic thereof in a third operational stage.

Referring now to FIGS. 6-8, the airflow 70 through the clean molding apparatus 10 during the different stages of operation is shown schematically. Because the air supplied by the HEPA filter cover unit 60 is at a relatively low flow rate and, hence, a relatively low pressure in view of the sizes of the exit orifices in this control volume context, the flows are assumed incompressible in applying the Bernoulli and continuity equations. In the first stage, then, as shown in FIG. 6, the apparatus 10 is operating at steady state with the first door 26 between the receiving and secondary chambers 20, 40 closed so that the airflow 70 entering the receiving chamber 20 exits through the chute 90 and the airflow 70 entering the secondary chamber 40 exits through the vent 80. It is desirable that no non-negligible pressure differential, or pressure build-up in the secondary chamber 40, be created, so that when the first door 26 is opened in order to pass packaged molded articles 110 into the secondary chamber 40 (see FIG. 7), the airflow 70 will continue in its steady state pattern or, if anything, move through the receiving chamber 20 toward the secondary chamber 40. In this way, ultimately, there will be no effective cross-contamination or compromise of the receiving chamber 20 even when temporarily opened to the secondary chamber 40. Applying the continuity equation to this context, for there to be equal or greater pressure build-up, even if low, in the receiving chamber 20 as compared to the secondary chamber 40, it follows that the airflow 70 must leave the secondary chamber 40 through the vent 80 at a rate equal to the rate at which the airflow 70 leaves the receiving chamber 20 through the chute 90. Per the continuity equation, this would be accomplished so long as the ratio of the secondary chamber filter projected area 64 ($A_s$) to the vent projected area 88 ($A_v$) is the same as or less than the ratio of the receiving chamber filter projected area 62 ($A_r$) to the chute projected area 98 ($A_c$).

$$(A_s/A_v) \leq (A_r/A_c)$$

As set forth above, in the exemplary embodiment of the present invention, the chute projected area 98 ($A_c$) is 28.3 in$^2$, the receiving chamber filter projected area 62 ($A_r$) is 768 in$^2$ (32"×24"), and the secondary chamber filter projected area 64 ($A_s$) is 384 in$^2$ (16"×24"). Solving for the optimized vent projected area 88 ($A_v$) as the chute projected area 98 multiplied by the secondary chamber filter projected area 64 divided by the receiving chamber filter projected area 62, or multiplied by the filter ratio, results in a vent projected area 88 of greater than or equal to 14.2 in$^2$, or roughly one-half the chute projected area 98, as would be expected considering that the ratio of the filter projected areas 62, 64 and of the volumes of the respective receiving and secondary chambers 20, 40 are also 1:2. Similarly, applying the Bernoulli equation accounting for pressure and flow rate and assuming that the velocities of the air entering and exiting the receiving chamber 20 are to be equivalent to those entering and exiting the secondary chamber 40, it follows that the velocity of air exiting the receiving chamber 20 ($v_{r,exit}$) equals the velocity of air exiting the secondary chamber ($v_{s,exit}$) equals the flow rate into the secondary chamber ($Q_s$) divided by the vent projected area 88 ($A_v$).

$$v_{r,exit} = v_{s,exit} = (Q_s/A_v)$$

Assuming that the flow rate generated by the HEPA cover unit 60 is 750 ft³/min, the flow rate into the receiving chamber 20 ($Q_r$) is two-thirds of the total flow rate, or 500 ft³/min, and the flow rate into the secondary chamber ($Q_s$) is one-third of the total flow rate, or 250 ft³/min. It follows that the velocity of air exiting the receiving chamber 20 ($v_{r,exit}$) is the flow rate into the receiving chamber 20 ($Q_r$) divided by the chute projected area 98 ($A_c$), which works out to 2,500 ft/min. Solving again for the vent projected area 88 ($A_v$), it is once more determined to be approximately 14.2 in², or roughly one-half the chute projected area 98. However, a further means of optimizing the vent projected area 88, and thus the vent size, is to consider that at the flow rates and pressures involved, some pressure build-up in the secondary chamber 40 will be negligible and, hence, not cause cross-contamination of the receiving chamber 20 when the first door 26 between the chambers 20, 40 is opened. It has been determined empirically that the vent projected area 88 can be at least as low as 25% of the filter ratio multiplied by the chute projected area 98 for the clean molding apparatus 10 to still function as intended. That is, in the exemplary embodiment of the apparatus 10, the actual vent projected area 88 is 3.5 in², or roughly one-fourth of the 14.2 in² determined to be the minimum vent projected area 88 needed to produce no pressure build-up. Thus, the pressure that is built up at this reduced vent size is effectively negligible, as a clean molding apparatus 10 configured and operating as in the exemplary embodiment has been tested and certified to class 100.

As also shown in FIG. 6, a molded article 110 molded in the adjacent mold machine 100' (FIG. 5) has passed through the chute 90 and is located in the low-particulate, controlled environment of the receiving chamber 20. Moving now to FIG. 7, there is shown one or more such molded articles 110 sealably packaged and passed through the opened first door 26 into the secondary chamber 40. Again, this packaging operation can be accomplished by an operator accessing the first interior space 22 of the receiving chamber 20 through the hand access ports 28 (FIG. 1) or through any other such access means now known or later developed. Where the packaging step is at least in part a manual operation, the same means for accessing the molded articles 110 may also be employed in operating the selectively openable first door 26 effectively from within the receiving chamber 20. Though the first door 26 is shown as a vertically hinged door, or barrier, selectively covering the first opening 34 between the receiving and secondary chambers 20, 40 and opening into the receiving chamber 20, it will be appreciated that a number of other barrier configurations and opening modes may be employed without departing from the spirit and scope of the invention, such as roll-up doors, sliding doors, accordion doors, and a variety of curtains and other such barriers. Moreover, with any such door configuration, it is also possible that the operation of the door can be accomplished in an automated fashion or otherwise through external controls as is known in the art, which would be particularly advantageous where the packaging step is automated and access to the first interior space 22 of the receiving chamber 20 during operation of the clean molding apparatus 10 is generally unnecessary. As with the attachment of the chute 90 to the receiving chamber 20, it is not necessary that the first door 26 be airtight or positively sealed, but only that, when closed, it cause the steady state flows within each of the chambers 20, 40 as described above in connection with FIG. 6. Essentially, at the relatively low flows and pressures associated with the clean molding apparatus 10 and the resulting substantially equivalent pressures in the two chambers 20, 40 during operation, the airflow 70 entering each of the chambers 20, 40 will take the path of least resistance out through the respective chute 90 and vent 80. Therefore, at this stage of operation wherein the first door 26 between the receiving and secondary chambers 20, 40 is temporarily opened, because the vent 80 is configured to allow the airflow 70 to exit at a rate effectively equal to or greater than that exiting the chute 90, it follows that even when the door 26 is open, the airflow 70 continues substantially in its steady-state pattern or, if anything, some of the airflow 70 entering the receiving chamber 20 passes through the open first door 26 and into the secondary chamber 40 before exiting through the vent 80. It will be appreciated by those skilled in the art that in this way effectively no air moves from the secondary chamber 40 into the receiving chamber 20 when the door 26 between them is opened, thereby preventing cross-contamination or compromise of the clean environment of the receiving chamber 20 as the packaged molded articles 110 are passed out of the receiving chamber 20 into the secondary chamber 40. Once the articles 110 are passed through the opening 34 into the secondary chamber 40, the first door 26 is again closed, returning the clean molding apparatus 10 to its steady state operation depicted schematically in FIG. 6.

Next turning to FIG. 8, there is shown the packaged molded articles 110 passed through the opened second door 46 and out of the secondary chamber 40. As with the first door 26, though the second door 46 is shown as a vertically hinged door opening away from the secondary chamber 40, again, a number of other barrier configurations now known and later developed can be employed in the present invention in selectively covering the second opening 54 formed in the secondary chamber 40 for the purpose of accessing the second interior space 42 and retrieving therefrom packaged molded articles 110 passed into the secondary chamber 40 from the receiving chamber 20 through the selectively openable first door 26. Based on the airflow 70 steady state continuity principles discussed above, the relationships between the various projected areas within the secondary chamber 40 can also be understood. Specifically, it will be appreciated that in order to minimize contamination in even the secondary chamber 40, it is important that when the second door 46 is opened, the airflow 70 entering the secondary chamber 40 tend to exit through the second door 46 at a rate greater than or equal to that exiting through the vent 80. In this way, outside air that has not passed through the HEPA filter cover unit 60 will effectively be prevented from entering the secondary chamber 40 through the open second door 46, as the airflow 70 out will be greater. In contrast, were the airflow 70 to tend to exit through the vent 80 at a rate greater than that exiting the opened second door 46, the result would be that outside air would be pulled into the secondary chamber 40 through the second door 46. Taking into consideration the effect of projected area on flow rate, as explained above, it follows that a first desirable relationship for features of the secondary chamber 40 is for the second door projected area 48 ($A_d$), or the projected area into the secondary chamber 40 of the second opening 54, to be greater than or equal to the vent projected area 88 ($A_v$).

$$A_d \geq A_v$$

It is further desirable that the airflow 70 entering the secondary chamber 40 be greater than or equal to the airflow 70 exiting through both the opened second door 46 and the vent 80 combined, again, so that air will continue to move out away from the secondary chamber 40 even when the second door 46 is open and effectively no outside, unfiltered air will be pulled into the secondary chamber 40, whether through the open second door 46 or the vent 80. It follows, then, that the secondary chamber filter projected area 64 ($A_s$) is to be greater than or equal to the second door projected area 48 ($A_d$) and the vent projected area 88 ($A_v$) combined.

$$A_s \geq (A_d + A_v)$$

Once the articles 110 are passed out of the secondary chamber 40 through the opening 54, the second door 46 is again closed, once more returning the clean molding apparatus 10 to its steady state operation depicted schematically in FIG. 6. Those skilled in the art will thus appreciate that by packaging the molded articles 110 in the low-particulate count environment of the receiving chamber 20, then passing the packaged molded articles 110 into the low-particulate count environment of the secondary chamber 40, and closing the first door 26 between the chambers 20, 40 before accessing the articles 110 in the secondary chamber 40 through the second door 46, the receiving chamber 20, and thus the molded articles 110 themselves, remain essentially uncompromised while allowing the articles 110 to be packaged and ultimately passed out of the clean molding apparatus 10 for shipment.

As stated previously, the chute 90 can take on a variety of sizes and configurations as needed based on the configuration of the mold machine 100 and the size and shape of the molded articles 110. Beyond the gravity-feed, enclosed, tubular slide shown, the chute 90 may be an enclosed conveyor, ramp, elevator or other such part-mover now know or later developed. For purpose of the airflow 70 through the clean molding apparatus 10, it is the resulting variance of the chute projected area 98 into the receiving chamber 20 that is to be accounted for. Under the continuity principles, it may be preferable to have the vent 80 change in size accordingly so that the relative projected areas remain at roughly the same proportion and the performance of the overall clean molding apparatus 10 continue generally as described above. Thus, in this embodiment, it is desirable to form the vent 80 such that its effective projected area 88 can be easily varied. There are a number of means by which the size and/or configuration of the vent 80 can be modified, both now known and later developed in the art. An exemplary adjustable opening is shown in FIGS. 9a-d, wherein the vent 80 is again configured as a substantially circular opening 82, but now having a slotted frame 83 around three sides of the opening 82 for removable receipt of covers 84, 84' of varying patterns and sizes of holes 86, 86'. As such, one cover is easily replaced with another by sliding them in and out of the slotted frame 83 to quickly and conveniently vary the effective vent projected area. Thus, as shown in FIG. 9a, a first cover 84 is in position within the frame 83 over the vent opening 82 so as to create a first vent projected area. In FIG. 9b, the first cover 84 is partially removed from the slotted frame 83, as when it is to be replaced by a different cover 84' so as to vary the vent projected area. Next, in FIG. 9c, the first cover 84 is completely removed and a different second cover 84' is in position to be inserted in the slotted frame 83. Finally, in FIG. 9d, the second cover 84' is fully inserted in the frame 83 over the opening 82 so as to yield a second vent projected area. Again, numerous other such means for varying the vent projected area 88 are possible without departing from the spirit and scope of the invention, including pivoting louvers, slidable overlapping openings, etc., whereby the removable covers 84, 84' shown and described are merely exemplary. Alternatively, the vent 80 may be configured to be sufficiently large to accommodate the full anticipated range of chute 90 sizes, in which case the desired relationship of the exit flow rate from the secondary chamber 40 through the vent 80 being effectively greater than or equal to the exit flow rate from the receiving chamber 20 through the chute 90 would always be satisfied.

In use, the portable clean molding apparatus 10 of the present invention is first positioned adjacent to a mold machine 100 from which molded articles 110 are to be ejected for packaging and shipment. The clean molding apparatus 10 is a stand-alone unit that is relatively small in size, constructed of relatively lightweight materials, and configured with sliding or rolling feet so that locating the apparatus 10 in various positions adjacent to a variety of mold machines 100 is a simple maneuver. As explained previously, the clean molding apparatus 10 has in an exemplary embodiment a parts chute 90 that is positioned proximal to the mold machine 100's mold (not shown) or connected at its free end 94 to the mold itself using tie bar sleeves or the like (not shown), so that once the apparatus 10 is in position, it is effectively rendered operable by plugging the unit into a 115-volt power source (not shown). Cleaning and maintenance of the apparatus 10 can be performed right on location; specifically, in the receiving chamber 20 through the front access door 30 and in the secondary chamber 40 through the second door 46. The front access door 30 may also be used to supply the receiving chamber 20 with a parts container and the necessary packaging supplies (not shown), for example. With the apparatus 10 in position and supplied with power and the receiving and secondary chambers 20, 40 cleaned and prepared for use, the HEPA filter cover unit 60 may be operated so as to blow a low-particulate, positive airflow 70 into the chambers 20, 40, as described above. Again, the airflow 70 entering the receiving and secondary chambers 20, 40 is exhausted through the chute 90 and the vent 80, respectively. After the filtered air has been forced through the clean molding apparatus 10 for a few minutes to reach a low-particulate, steady state flow as depicted schematically in FIG. 6, the apparatus 10 is ready for use. As articles 110 are molded in the mold machine 100 and ejected from the mold itself (not shown), they pass through the chute 90 into the first interior space 22 of the receiving chamber 20. There, the molded articles 110 may be inspected, deburred, etc., as necessary, and then packaged, either through automated processes or manually by an operator accessing the first interior space 22 through the glove access ports 28 installed in the front access door 30 of the receiving chamber 20. Once the desired number of molded articles 110 are so packaged, with the second door 46 of the secondary chamber 40 remaining closed, the first door 26 between the receiving and secondary chambers 20, 40 is opened and the packaged molded articles 110 are passed into the second interior space 42 of the secondary chamber 40. Then, the first door 26 is closed so as to again isolate the receiving chamber 20 from the secondary chamber 40. The packaged molded articles 110 are next passed out of the secondary chamber 40 through the selectively openable second door 46 and are boxed or otherwise prepared for shipment. In an alternative use, it is possible that parts so packaged may be later returned to the same or another clean molding apparatus 10 for subsequent inspection and sorting. In this case, the apparatus 10 would not require a chute 90 for receipt of the molded articles 110 from a mold machine 100. Accordingly, the opening 32 in the receiving chamber 20 through which the chute 90 was inserted may serve as a ventilation hole in much the same way as the vent 80 of the secondary chamber 40. In this way, the so configured clean molding apparatus 10 may be placed in any convenient location and, again, rendered operable by simply plugging the unit into a 115-volt power source (not shown).

Then, to return previously packaged molded articles 110 to the receiving chamber 20 for inspection or sorting, essentially the reverse steps would be followed as described above for moving packaged parts out of the clean molding apparatus 10. That is, with the first door 26 between the receiving and secondary chambers 20, 40 closed, the second door 46 is opened and the articles 110 are passed into the secondary chamber 40. Once the second door 46 is again closed, the first door 26 is then opened and the parts moved from the secondary chamber 40 back into the receiving chamber 20, with the first door 26 once again closed afterward. Now the molded articles 110 can be removed from their packaging and inspected and sorted as necessary in the uncompromised receiving chamber 20 through the glove access ports 28 or other such means. Removing the subsequently inspected, sorted and repackaged molded articles 110 from the clean molding apparatus 10 is then as before. It will be appreciated by those skilled in the art that the portable clean molding apparatus and method of the present invention is thus economical and versatile in operation by effectively creating a portable mini-clean room environment outside of a mold machine, in which molded parts may be received and manipulated and then passed out of without compromising its low particulate count environment, thereby eliminating the need for a larger and more costly clean room and the associated logistical drawbacks due to the then limited number of mold machines that can be employed in clean molding applications.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A portable clean molding apparatus for receipt of molded articles ejected from a mold machine, comprising:
   a receiving chamber having a first interior space and a first side including a selectively openable first door;
   a secondary chamber joined to the receiving chamber substantially along the first side and having a second interior space and a second side including a selectively openable second door;
   an air filtration cover unit installed over the receiving and secondary chambers so as to provide a low-particulate, positive airflow into the first and second interior spaces;
   at least one vent intersecting the secondary chamber so as to communicate with the second interior space and allow the airflow to exit the secondary chamber; and
   at least one chute intersecting the receiving chamber at a first end so as to communicate with the first interior space and allow the airflow to exit the receiving chamber, the chute being located adjacent to the mold machine at a second end, whereby the molded articles ejected from the mold machine pass through the chute into the receiving chamber, are there sealably packaged, are then passed into the secondary chamber through the selectively openable first door, and, after the first door has been closed, are next passed out of the secondary chamber through the selectively openable second door.

2. The apparatus of claim 1 wherein:
   the second door is configured so as to have a second door projected area into the secondary chamber;
   the vent is configured so as to have a vent projected area into the secondary chamber; and
   the second door projected area is greater than or equal to the vent projected area.

3. The apparatus of claim 2 wherein:
   the portion of the cover unit over the secondary chamber is configured so as to have a secondary chamber filter projected area into the secondary chamber; and
   the secondary chamber filter projected area is greater than or equal to the second door projected area and the vent projected area combined.

4. The apparatus of claim 1 wherein:
   the second door is configured so as to have a second door projected area into the secondary chamber;
   the vent is configured so as to have a vent projected area into the secondary chamber;
   the portion of the cover unit over the secondary chamber is configured so as to have a secondary chamber filter projected area into the secondary chamber; and
   the secondary chamber filter projected area is greater than or equal to the second door projected area and the vent projected area combined.

5. The apparatus of claim 1 wherein:
   the chute is configured so as to have a chute projected area into the receiving chamber;
   the portion of the cover unit over the receiving chamber is configured so as to have a receiving chamber filter projected area into the receiving chamber;
   the vent is configured so as to have a vent projected area into the secondary chamber;
   the portion of the cover unit over the secondary chamber is configured so as to have a secondary chamber filter projected area into the secondary chamber;
   a filter ratio is defined as the secondary chamber filter projected area divided by the receiving chamber filter projected area; and
   the vent projected area is at least greater than or equal to the chute projected area multiplied by 25% of the filter ratio.

6. The apparatus of claim 5 wherein the vent projected area is greater than or equal to the chute projected area multiplied by the filter ratio.

7. The apparatus of claim 1 wherein:
   the second door is configured so as to have a second door projected area into the secondary chamber;
   the vent is configured so as to have a vent projected area into the secondary chamber;
   the second door projected area is greater than or equal to the vent projected area;
   the portion of the cover unit over the secondary chamber is configured so as to have a secondary chamber filter projected area into the secondary chamber;
   the secondary chamber filter projected area is greater than or equal to the second door projected area and the vent projected area combined;
   the chute is configured so as to have a chute projected area into the receiving chamber;
   the portion of the cover unit over the receiving chamber is configured so as to have a receiving chamber filter projected area into the receiving chamber;
   a filter ratio is defined as the secondary chamber filter projected area divided by the receiving chamber filter projected area; and
   the vent projected area is greater than or equal to the chute projected area multiplied by 25% of the filter ratio.

8. The apparatus of claim 1 wherein:
   the portion of the cover unit over the secondary chamber is configured so as to have a secondary chamber filter projected area into the secondary chamber and the portion of the cover unit over the receiving chamber is configured so as to have a receiving chamber filter projected area into the receiving chamber, such that a filter ratio is defined as the secondary chamber filter projected area divided by the receiving chamber filter projected area;

a second chute is interchangeable with the at least one chute so as to accommodate varying sizes of molded articles, each chute being configured so as to have a respective chute projected area into the receiving chamber; and the vent is configured so as to have a vent projected area into the secondary chamber and is further configured with an adjustable opening so as to vary the vent projected area according to the respective chute projected area such that the vent projected area is greater than or equal to the chute projected area multiplied by 25% of the filter ratio.

9. The apparatus of claim 1 wherein the first interior space is approximately double the second interior space.

10. The apparatus of claim 1 wherein the receiving chamber comprises:
a means for accessing the first interior space while the apparatus is in operation so as to not compromise the first interior space; and
a means for opening the receiving chamber to access the first interior space while the apparatus is not in operation.

11. The apparatus of claim 1 wherein the cover unit comprises a 99.99% minimum efficiency HEPA filter at 0.3 micron particulate size.

12. A portable clean molding apparatus for receipt of molded articles, comprising:
a receiving chamber having a first interior space and a first opening covered by a selectively openable first barrier;
a secondary chamber joined to the receiving chamber so as to be in selective communication therewith through the first opening and having a second interior space including a second opening covered by a selectively openable second barrier;
a means for blowing filtered air into the receiving and secondary chambers so as to provide a low-particulate, positive airflow into the first and second interior spaces;
a first means for venting the airflow from the receiving chamber; and
a second means for venting the airflow from the secondary chamber, the second venting means allowing the airflow to exit the secondary chamber at a rate equal to or greater than the airflow exiting the receiving chamber through the first venting means.

13. The apparatus of claim 12 wherein:
the second venting means is configured so as to have a second venting means projected area into the secondary chamber;
the portion of the blowing means adjacent the secondary chamber is configured so as to have a secondary chamber blowing means projected area into the secondary chamber;
the first venting means is configured so as to have a first venting means projected area into the receiving chamber;
the portion of the blowing means adjacent the receiving chamber is configured so as to have a receiving chamber blowing means projected area into the receiving chamber;
a blowing means ratio is defined as the secondary chamber blowing means projected area divided by the receiving chamber blowing means projected area; and
the second venting means projected area is greater than or equal to the first venting means projected area multiplied by 25% of the blowing means ratio.

14. The apparatus of claim 13 wherein:
the second opening is configured so as to have a second opening projected area into the secondary chamber;
the second opening projected area is greater than or equal to the second venting means projected area; and
the secondary chamber blowing means projected area is greater than or equal to the second opening projected area and the second venting means projected area combined.

15. A portable clean molding apparatus for receipt of molded articles ejected from a mold machine, comprising:
a receiving chamber having a first interior space;
a secondary chamber joined to the receiving chamber and having a second interior space and a selectively openable door;
an air filtration cover unit installed over the receiving and secondary chambers so as to provide a low-particulate, positive airflow into the first and second interior spaces;
at least one vent intersecting the secondary chamber so as to communicate with the second interior space and allow the airflow to exit the secondary chamber; and
at least one chute intersecting the receiving chamber at a first end so as to communicate with the first interior space and allow the airflow to exit the receiving chamber, the chute being located adjacent to the mold machine at a second end, whereby the molded articles ejected from the mold machine pass through the chute into the receiving chamber;
a means for passing the molded articles from the receiving chamber into the secondary chamber without compromising the receiving chamber, whereby the molded articles passed through the chute into the receiving chamber are there sealably packaged and are then passed into the secondary chamber through the passing means; and
a means for accessing the second interior space of the secondary chamber, whereby the packaged molded articles passed into the secondary chamber are selectively retrieved through the access means.

16. A portable clean molding apparatus for receipt of molded articles ejected from a mold machine, comprising:
a receiving chamber having a first interior space and a first side including a selectively openable first door;
a secondary chamber joined to the receiving chamber substantially along the first side and having a second interior space and a second side including a selectively openable second door, the second door being configured so as to have a second door projected area into the secondary chamber;
an air filtration cover unit installed over the receiving and secondary chambers so as to provide a low-particulate, positive airflow into the first and second interior spaces, the portion of the cover unit over the receiving chamber being configured so as to have a receiving chamber filter projected area into the receiving chamber and the portion of the cover unit over the secondary chamber being configured so as to have a secondary chamber filter projected area into the secondary chamber, a filter ratio being defined as the secondary chamber filter projected area divided by the receiving chamber filter projected area;
a vent intersecting the secondary chamber so as to communicate with the second interior space and allow the airflow to exit the secondary chamber, the vent being configured so as to have a vent projected area into the secondary chamber such that the second door projected area is greater than or equal to the vent projected area and the secondary chamber filter projected area is greater than or equal to the second door projected area and the vent projected area combined; and a chute intersecting the receiving chamber at a first end so as to communicate with the first interior space and allow the airflow to exit the receiving chamber, the chute being configured so as to have a chute projected area into the receiving chamber and being located adjacent to the mold machine at a second end, the vent projected area being at least greater than or equal to the chute projected area multiplied by 25% of the filter ratio, whereby the molded articles ejected from the mold machine pass through the chute into the receiving chamber, are there sealably packaged, are then passed into the secondary chamber through the selectively openable first door, and, after the first door has been closed, are next passed out of the secondary chamber through the selectively openable second door.

* * * * *